US010736443B2

(12) United States Patent
Wu et al.

(10) Patent No.: US 10,736,443 B2
(45) Date of Patent: Aug. 11, 2020

(54) SMART MIRROR AND CONTROL METHOD THEREOF

(71) Applicant: OPPLE LIGHTING CO., LTD., Shanghai (CN)

(72) Inventors: Gongyu Wu, Shanghai (CN); Wei Chen, Shanghai (CN); Xingxing Xu, Shanghai (CN); Feng Li, Shanghai (CN)

(73) Assignee: Opple Lighting Co., Ltd., Shanghai (CN)

( * ) Notice: Subject to any disclaimer, the term of this patent is extended or adjusted under 35 U.S.C. 154(b) by 0 days.

(21) Appl. No.: 16/284,848

(22) Filed: Feb. 25, 2019

(65) Prior Publication Data

US 2019/0183263 A1 Jun. 20, 2019

Related U.S. Application Data

(63) Continuation of application No. PCT/CN2017/097390, filed on Aug. 14, 2017.

(30) Foreign Application Priority Data

Aug. 23, 2016 (CN) .......................... 2016 1 0711043
Aug. 23, 2016 (CN) ..................... 2016 2 0928208 U (51) Int. Cl.
*A47G 1/02* (2006.01)
*G09G 5/10* (2006.01)
(Continued)

(52) U.S. Cl.
CPC ................ *A47G 1/02* (2013.01); *F21V 3/062* (2018.02); *F21V 33/0024* (2013.01);
(Continued)

(58) Field of Classification Search
CPC .............. G09G 3/32; A47G 1/02; G06F 3/147
See application file for complete search history.

(56) References Cited

U.S. PATENT DOCUMENTS 9,629,532 B1 * 4/2017 Elazar ................ A61B 1/00034
2004/0160199 A1 * 8/2004 Morgan .................. A01M 1/04
315/312
(Continued)

FOREIGN PATENT DOCUMENTS

CN 203016430 U 6/2013
CN 103455212 A 12/2013
(Continued)

OTHER PUBLICATIONS

International Search Report and Written Opinion (including English translations) issued in PCT/CN2017/097390, dated Nov. 16, 2017, 15 pages.

*Primary Examiner* — Kent W Chang
*Assistant Examiner* — Chayce R Bibbee
(74) *Attorney, Agent, or Firm* — Arch & Lake LLP (57) ABSTRACT

A smart mirror and a control method thereof are provided. The smart mirror includes a rear cover; a display screen disposed on the rear cover and configured to display preset information; a lighting circuit disposed on the rear cover and configured to emit illumination beam; a distance sensing circuit disposed on the rear cover and configured to sense distance of a user in a target area; a control circuit disposed on the rear cover and electrically connected with the display screen, the lighting circuit and the distance sensing circuit, and configured to start one of the display screen and the lighting circuit according to the distance sensed by the distance sensing circuit; a display mirror surface that is disposed on the rear cover and only covers the display screen.

20 Claims, 7 Drawing Sheets

(51) Int. Cl.
  *F21V 3/06* (2018.01)
  *F21V 33/00* (2006.01)
  *G06F 3/147* (2006.01)
  *G09G 3/32* (2016.01)
  *F21Y 115/10* (2016.01)

(52) U.S. Cl.
  CPC .............. *G06F 3/147* (2013.01); *G09G 3/32* (2013.01); *G09G 5/10* (2013.01); *F21Y 2115/10* (2016.08); *G09G 2320/0626* (2013.01); *G09G 2354/00* (2013.01); *G09G 2370/16* (2013.01)

(56) References Cited

U.S. PATENT DOCUMENTS

2004/0184282 A1\* 9/2004 Nishijima ................. B60R 1/12
 362/516
2012/0320000 A1\* 12/2012 Takatsuka ............. G06F 1/1626
 345/179
2015/0379905 A1\* 12/2015 Kawasaki-Hedges ......................
 G09F 19/16
 40/427

FOREIGN PATENT DOCUMENTS

| CN | 106175300 A | 12/2016 | |
|---|---|---|---|
| CN | 206390685 U | 8/2017 | |
| KR | 20040043259 A | 5/2004 | |
| WO | WO-2013180651 A1 * | 12/2013 | ............. G09F 13/12 |

\* cited by examiner

SMART MIRROR AND CONTROL METHOD THEREOF

CROSS-REFERENCE TO RELATED APPLICATIONS

This application is based upon and claims the priority of PCT patent application No. PCT/CN2017/097390 filed on Aug. 14, 2017 which claims the priority of Chinese Patent Application No. 201610711043.X filed on Aug. 23, 2016 and Chinese Patent Application No. 201620928208.4 filed on Aug. 23, 2016, the entire contents of which are hereby incorporated by reference herein.

TECHNICAL FIELD

The present disclosure relates to the field of smart devices, in particular to a smart mirror and a control method thereof.

BACKGROUND

As popular consumer goods, mirror has become essential equipment for home use. With the development of society, the mirror is not only used to groom oneself, but also used to display information such as weather, time and commercial advertisement to the user when the user does not have specific needs with regard to the use of the mirror, so that the role of the mirror can be more diversified and tends to be smart.

In the prior art, such smart mirror generally includes a display screen for displaying the aforementioned information, a display mirror surface on the display screen, and an infrared sensing circuit for sensing the position of the user. The display mirror surface generally adopts one-way glass coated with a thin silver or aluminum film. When the smart mirror is used, the position of the user is sensed by the infrared sensing circuit. When the distance between the user and the smart mirror is within a preset range, it is determined that the user needs to look into the mirror, and therefore the display screen is turned off, and the smart mirror is turned into a mirror for use by utilization of the intensity contrast between the inner side and the outer side of the mirror. When the distance between the user and the smart mirror is relatively long, it is determined that the user does not need to look into the mirror, and therefore, the display screen is turned on, and light emitted by the display screen is transmitted through the display mirror surface, so that the user can see the foregoing information.

However, when current smart mirror is used as a minor, it still does not overcome the drawback of requiring high ambient light intensity, which is existed in the use of traditional minor. For example, when the user uses the smart mirror to look into the mirror at night, he/she cannot see himself/herself at all, which severely reduces the user experience.

SUMMARY

Embodiments of the present disclosure provide a smart mirror and a control method thereof, which reconcile the requirement of achieving information display and the requirement to function as a mirror under diversified illuminance.

To solve the above-mentioned technical problems, the embodiments of the present disclosure provide a smart minor, which comprises: a rear cover; a display screen disposed on the rear cover and configured to display preset information; a lighting circuit disposed on the rear cover and configured to emit illumination beam; a distance sensing circuit disposed on the rear cover and configured to sense distance of a user in a target area; a control circuit disposed on the rear cover and electrically connected with the display screen, the lighting circuit and the distance sensing circuit, and configured to start one of the display screen and the lighting circuit according to the distance sensed by the distance sensing circuit; and a display mirror surface that is disposed on the rear cover and only covers the display screen.

To solve the above-mentioned technical problems, the embodiments of the present disclosure provide a control method of the smart minor as mentioned above, the control method comprises: acquiring, by the distance sensing circuit, the distance of the user in the target area, and taking the distance of the user in the target area as a user distance; and determining, by the control circuit, whether or not the user distance is within a preset lighting distance range, starting only the lighting circuit when the user distance is within the preset lighting distance range, and starting only the display screen when the user distance is not within the preset lighting distance range.

BRIEF DESCRIPTION OF THE DRAWINGS

In order to more clearly illustrate the embodiments of the present disclosure or the technical solutions in the prior art, the drawings used in the embodiments or the description of the prior art will be briefly described below. Obviously, the drawings in the following description are only related to some embodiments described in the present disclosure, and other drawings can also be obtained by those skilled in the art without creative efforts according to these drawings.

DETAILED DESCRIPTION

Embodiments of the present disclosure provide a smart mirror and a control method thereof, which are used to overcome the defect that the current smart mirror cannot reconcile the requirement of achieving information display and the requirement to function as a mirror under diversified illuminance.

In order to better understand the technical solutions in the present disclosure, the technical solutions in the embodiments of the present disclosure will be clearly and completely described in conjunction with the accompanying drawings in the embodiments of the present disclosure. Obviously, the described embodiments are only partial embodiments of the present disclosure and not all the embodiments. All other embodiments obtained by those skilled in the art based on the embodiments of the present disclosure without creative efforts shall fall within the scope of protection of the present disclosure.

Figure 1:
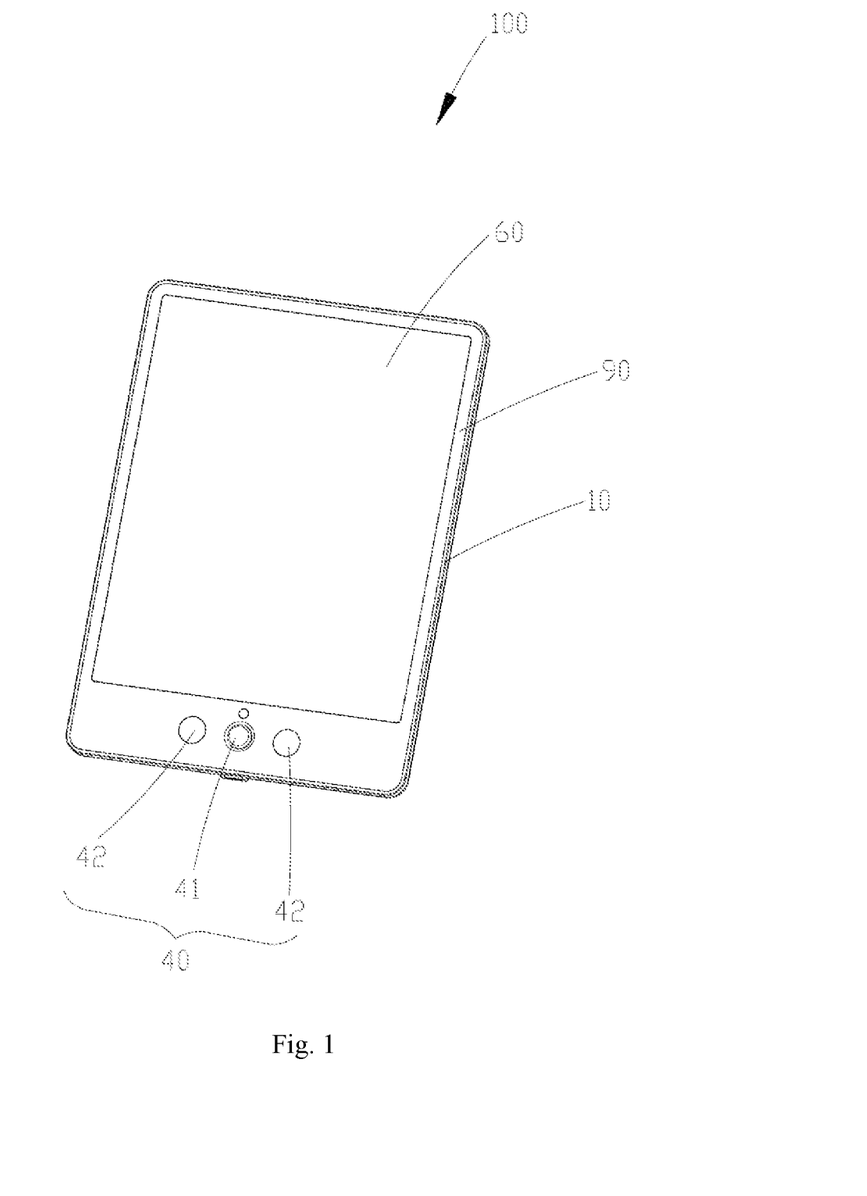
FIG. 1 is a three-dimensional diagram of a smart mirror provided by an embodiment of the present disclosure.
Figure 2:
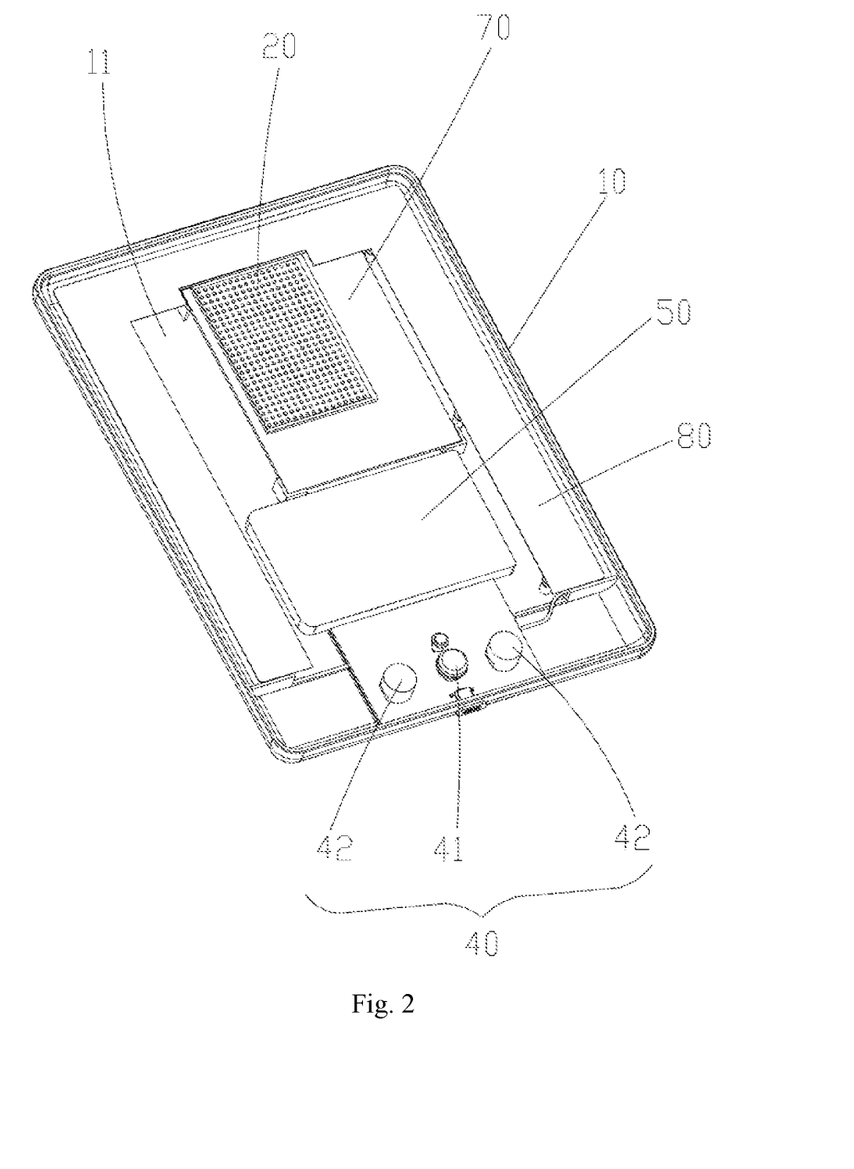
FIG. 2 is a three-dimensional diagram of the smart mirror as illustrated in FIG. 1, in which a display mirror surface and a light homogenization mask are hidden.
Figure 3:
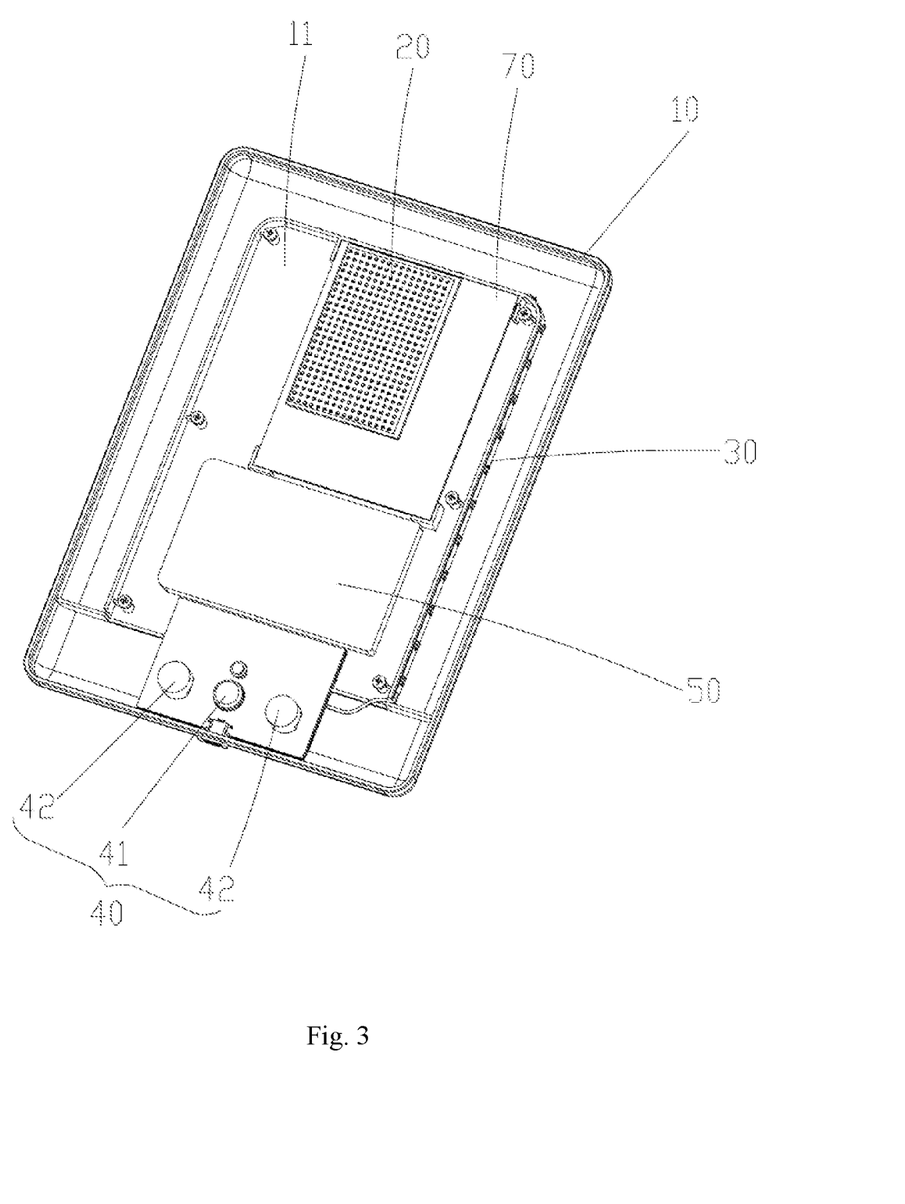
FIG. 3 is a three-dimensional diagram of the smart mirror as illustrated in FIG. 1, in which a display mirror surface, a light homogenization mask and an optical element are hidden.

As illustrated in FIGS. 1 to 3, a smart mirror 100 comprises a rear cover 10, a display screen 20, a lighting circuit 30, a distance sensing circuit 40, a control circuit 50 and a display mirror surface 60.

Functioning as the base of the smart mirror 100, the rear cover 10 is generally made from materials such as rigid plastics and metals. The smart mirror 100 is mounted to an area such as a wall surface through the rear cover 10. In actual application, the rear cover 10 can be mounted to the foregoing area by means of screws, suspension, fasteners, etc. No further description will be given here.

In the embodiments of the present disclosure, the rear cover 10 is roughly rectangular and concave, toward an inner side, to form an accommodating cavity 11; and the display screen 20, the lighting circuit 30, the distance sensing circuit 40 and the control circuit 50 are all disposed in the accommodating cavity 11.

The display screen 20 is configured to display preset information. The preset information may be weather information, time information or other types of information such as commercial advertisement, news. The smart mirror 100 has different use environment according to different preset information. For example, when the preset information is mainly the commercial advertisement information, the smart mirror 100 can be placed in a commercial place to play the role of an advertising lamp box.

In the embodiments of the present disclosure, the display screen 20 may adopt an LED dot matrix display screen. The LED dot matrix display screen comprises a large number of LED units. The lighting state of the LED units is controlled to display corresponding text, pictures, and even animations and videos.

In the embodiments of the present disclosure, the smart mirror 100 further comprises a communication circuit 70 disposed in the accommodating cavity 11. The communication circuit 70 may be any one or more of a Bluetooth communication circuit, a WIFI communication circuit, a Zigbee communication circuit, an infrared communication circuit, an NFC communication circuit or other wireless communication circuits. In actual application, the communication circuit 70 and the display screen 20 may be integrated onto the same circuit board. No further description will be given here.

In which the communication circuit 70 can communicate with a preset terminal (not illustrated in the figure) through corresponding wireless transmission protocol and then acquire the preset information from the preset terminal and transmit the preset information to the display screen 20. In actual application, the preset terminal may be a smart mobile phone, a tablet PC or other equipment. No further description will be given here. Of course, the display screen 20 is also not limited to acquire the preset information from the preset terminal through the communication circuit 70, and the preset information can be prestored in the display screen 20 for display. No further description will be given here.

The display mirror surface 60 is disposed on the rear cover 10 and covers the display screen 20. The display mirror surface 60 is made from one-way glass coated with a very thin silver or aluminum film, and the silver or aluminum film is closer to the display screen 20. The one-way glass does not reflect the entire incident light but allows partial incident light to pass through. When the display screen 20 is switched on, light emitted by the display screen 20 can pass through the display mirror surface 60 for the user to see. When the display screen 20 is turned off, the light within the inner side of the display mirror surface 60 cannot pass through because of low light intensity, and the display mirror surface 60 can only reflect the light at the outer side of the display mirror surface 60. In this case, the display mirror surface 60 is similar to a traditional mirror when the display circuit 20 is turned off.

The lighting circuit 30 is configured to emit illumination beam. The lighting circuit 30 may include an LED light strip or light sources in other types or shapes. For example, Thermoluminescence (TL) luminescent elements can also be adopted to form a square shaped circuit. No further description will be given here.

In actual application, the LED light strip is, for example, taken as the lighting circuit 30 and is positioned around the periphery of the display screen 20. For example, the LED strip can be positioned around at least three sides of the display screen 20.

In the embodiments of the present disclosure, the smart mirror 100 further comprises an optical element 80 covering the lighting circuit 30. The optical element 80 is configured to converge light emitted by the lighting circuit 30, so that the light can be emitted toward a direction away from the smart mirror 100, and mixed light can be avoided. In actual application, taking the case that the lighting circuit 30 is an LED light strip as an example, the optical element 80 includes a plurality of light-exiting holes (not marked with a numeral), and the size of the light-emitting hole is close to the size of the LED luminescent unit, so that the light emitted by each LED luminescent element can only be emitted out by passing through the light-emitting hole, thus avoiding the mixing of light between light emitted by adjacent LED luminescent elements and improving the illumination capability of the light emitted by the lighting circuit 30.

In the embodiments of the present disclosure, the smart mirror 100 further comprises a light homogenization mask 90 covering the optical element 80. The light emitted by the lighting circuit 30 arrives at the light homogenization mask 90 after the convergence of the optical element 80, and is uniformly irradiated to the user in front of the smart mirror 100 under the adjustment of the light homogenization mask 90. In actual application, the light homogenization mask 90 can be made from materials such as polycarbonate, so as to ensure the uniformity of light.

Preferably, the light homogenization mask 90 is positioned around the display mirror surface 60, and the light homogenization mask 90 is flush with the display mirror surface 60, so that the appearance of the smart mirror 100 can be more flat.

The distance sensing circuit 40 is configured to sense the distance of the user in a target area; the target area may be an area in front of the smart mirror 100; and the user can be sensed by the distance sensing circuit 40 when entering the target area; and then the distance between the user and the smart mirror 100 can be determined by the distance sensing circuit 40.

In actual application, the distance sensing circuit 40 penetrates through the light homogenization mask 90, so as to sense the distance of the user in real time.

In the embodiments of the present disclosure, the distance sensing circuit 40 includes an infrared sensing circuit 41 and an ultrasonic sensing circuit 42.

The infrared sensing circuit 41 refers to a sensor utilizing pyroelectric effect. Whether or not the user enters the target area can be detected by firstly aligning the infrared sensing circuit 41 with the target area and then sensing infrared light emitted by the body of the user. The infrared circuit 41 generally has a recognition distance of about 3 meters and can sense entering of the user into the target area in time and sense the movement of the human body.

The ultrasonic sensing circuit 42 refers to a sensor utilizing the Doppler characteristic of ultrasonic sound. The distance of the user is determined by aligning the ultrasonic sensing circuit 42 with the target area, generating high-frequency mechanical wave in short-wave wavelength range by the vibration of, for example, a transducer wafer, which is driven by a voltage, in the ultrasonic sensing circuit 42; and utilizing the echo wave generated by the mechanical wave through hitting, for example, a moving object. The recognition distance of the ultrasonic sensing circuit 42 is relatively short and is generally within 2 meters, but the recognition accuracy is high, so the distance of the user can be accurately acquired.

In summary, the infrared sensing circuit 41 and the ultrasonic sensing circuit 42 are cooperated to form the distance sensing circuit 40, which can quickly identify the user entering the target area and determine the distance of the user.

In an embodiment of the present disclosure, the number of the ultrasonic sensing circuit 42 is set to be two, and the two ultrasonic sensing circuits are respectively disposed on two sides of the infrared sensing circuit 41. Because the transverse sensing angle of the ultrasonic sensing circuit 42 is small, adopting of two ultrasonic sensing circuits 42 arranged in parallel can increase the sensing angle of the distance sensing circuit 40 and ensure the in-time sensing of the distance of the user.

Of course, the number of the ultrasonic sensing circuit 42 can also be set to be more than two, and even, a plurality of the infrared sensing circuits 41 can also be set. The arrangement mode of the infrared sensing circuit is also not limited to the foregoing mode in which the infrared sensing circuit 41 is centered, and the infrared sensing circuit can be preset according to the size of the smart mirror 100. No further description will be given here.

The control circuit 50 is connected with the display screen 20, the lighting circuit 30 and the distance sensing circuit 40. The control circuit 50 acquires the distance of the user from the distance sensing circuit 40 and then starts one of the display screen 20 and the lighting circuit 30 according to the distance of the user.

For example, when a user distance is greater than a certain preset value, it can be determined that the distance between the user and the smart mirror 100 is too large and the user has no demand of looking into the mirror, and then the display screen 20 is directly switched on, so as to utilize the smart mirror 100 to display the preset information. When the user distance is less than the certain preset value, it can be determined that the distance between the user and the smart mirror 100 is close enough, and the possibility of the user to look into the mirror to groom himself/herself is large, and then the lighting circuit 30 is directly switched on. Thus, the smart mirror 100 becomes a mirror capable of adapting to the diversified ambient light illuminance, and the user can look into the mirror to groom himself/herself under the irradiation of the light emitted by the lighting circuit 30, thereby improving the user experience.

In the embodiments of the present disclosure, the smart mirror 100 further comprises an illuminance sensing circuit (not illustrated in the figure) disposed in the accommodating cavity 11. The light illuminance of the environment in which the smart mirror 100 is located can be sensed by utilization of the illuminance sensing circuit. The illuminance sensing circuit is connected with the control circuit 50, and the control circuit 50 obtains the illuminance acquired by the illuminance sensing circuit. When the illuminance is lower than a preset value, it can be determined that the environment in which the smart mirror 100 is located requires lighting, and then the lighting circuit 30 can be directly switched on to function as a night-light. This is an independent judgment logic independent from the distance sensing circuit 40, for another example, the independent judgment logic and the distance sensing circuit 40 can be integrated or work independently. No further description will be given here.

In summary, the smart mirror 100 provided by the embodiments of the present disclosure senses the distance of the user in the target area through the distance sensing circuit 40, determines the actual demand of the user according to the distance, starts one of the lighting circuit 30 and the display screen 20, so as to meet the actual demand of the user, the smart mirror 100 particularly adapts to the requirement of looking into the mirror with diversified ambient light illuminance, and improves the user experience.

Detailed description will be given below to the control method of the smart mirror 100 with reference to FIGS. 4 to 7.

Figure 4:
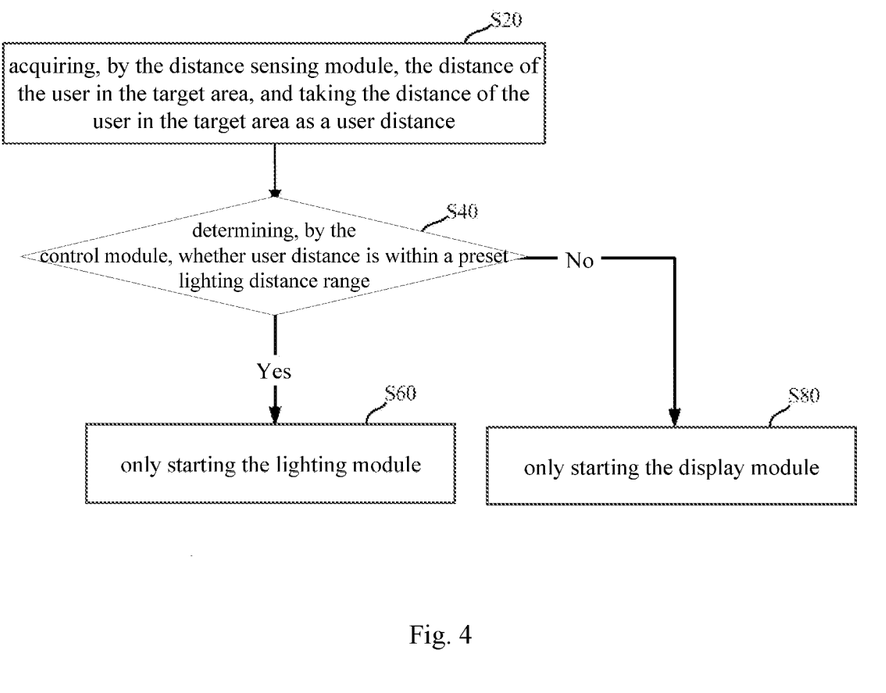
FIG. 4 is a flowchart of a control method of a smart mirror provided by a first embodiment of the present disclosure.

As illustrated in FIG. 4, in the first embodiment of the present disclosure, the control method comprises the following steps.

S20: allowing the distance sensing circuit 40 to acquire the distance of the user in the target area, and taking the distance as a user distance.

In an embodiment of the present disclosure, the distance sensing circuit 40 includes an infrared sensing circuit 41 and an ultrasonic sensing circuit 42, which are cooperated to determine whether or not the user is in the target area in time and determine the distance of the user.

In actual application, both the infrared sensing circuit 41 and the ultrasonic sensing circuit 42 are face towards the target area. Because the functioning range of the infrared sensing circuit 41 is larger than the functioning range of the ultrasonic sensing circuit 42, the infrared sensing circuit 41 is usually triggered at first, and in this case, when the user enters the target area and is gradually approaching to the smart mirror 100, the ultrasonic sensing circuit 42 can recognize the distance of the user.

The infrared sensing circuit 41 and the ultrasonic sensing circuit 42 are configured to monitor the target area in real time. When any of the infrared sensing circuit 41 and the ultrasonic sensing circuit 42 is triggered, the control method will also be started. The step S20 correspondingly and specifically includes one of the following steps according to the determination result that whether the infrared sensing circuit 41 or the ultrasonic sensing circuit 42 is triggered.

Acquiring a stored distance in a preset memory and taking the stored distance as the user distance when only the infrared sensing circuit 42 in the distance sensing circuit 40 is triggered.

Acquiring the distance of the user sensed by the ultrasonic sensing circuit and taking the distance as the user distance when the ultrasonic sensing circuit 42 in the distance sensing circuit 40 is triggered.

The functioning range of the ultrasonic sensing circuit 42 is smaller than the functioning range of the infrared sensing circuit 41. Moreover, the ultrasonic sensing circuit 42 has a blind area for the functioning range. The blind area for the functioning range is usually ranged from 0 to 0.3 meter.

When only the infrared sensing circuit 41 is triggered, the user may still be outside the functioning range of the ultrasonic sensing circuit 42, namely the user is far away from the smart mirror 100, or the user has been close to the blind area for the functioning range of the ultrasonic sensing circuit. In this case, the user distance cannot be acquired by the ultrasonic sensing circuit 42, and the stored distance in the preset memory is taken as the user distance. The stored distance in the preset memory is the newest distance data of the user. The forming principle of the stored distance in the preset memory will be subsequently described in detail with reference to specific steps. No further description will be given here.

Correspondingly, when the ultrasonic sensing circuit 42 is triggered, the accurate distance of the user can be determined through the ultrasonic sensing circuit 42 and taken as the user distance.

S40: allowing the control circuit to determine whether or not the user distance is within a preset lighting distance range, executing step S60 when the user distance is within the preset lighting distance range, and executing step S80 when the user distance is not within the preset lighting distance range.

The preset lighting distance range may be set to be 0.3 m to 0.5 m, by taking the distance that the user actually adopts to look into the mirror as a reference. Of course, adjustments can also be made according to user habits. No further description will be given here.

When the user distance is within the preset lighting distance range, the user is in the state of looking into the mirror, and then the lighting circuit 30 is switched on to illuminate the user, so that the user can be irradiated in the environment with reasonable illuminance, and therefore the user experience can be improved.

When the user distance exceeds the preset lighting distance range, the distance of the user is either greater than the range, that is, the user is too far away to look into the mirror but to pass by or stand far away, and the display screen 20 is switched on to display the preset information; or the user is too close to the smart mirror 100 to look into the mirror, and the display screen 20 is also switched on to display the preset information.

The real behavior of the user is recognized by taking the preset lighting range, formed by the distance of the user actually looking into the mirror, as reference, and then the state of the smart mirror 100 is correspondingly adjusted, thereby improving the user experience.

It should be noted that when the user distance is acquired by the step S20, the user distance has two sources, and scenes corresponding to two sources are described in detail with reference to the two sources.

The user is unable to remain absolutely stationary when facing the smart mirror 100, and any displacement or motion may be sensed by the distance sensing circuit 40. Moreover, the ultrasonic sensing circuit 42 has a blind area for the functioning range. In order to prevent the consequence caused by the case that the user enters into the blind area and the user distance is unable to be detected, the stored distance in the preset memory is taken as the user distance when the infrared sensing circuit 41 is triggered but the ultrasonic sensing circuit 42 do not detect the user distance, and therefore the distance of the user can be continued to be obtained, so as to ensure the user experience.

S60: only switching on the lighting circuit 30.

S80: only switching on the display screen 20.

It should be noted that when the step S60 or S80 is executed, it will encounter that the circuit that does not need to be switched on is still in the state of being switched on, and in this case, the circuit that does not need to be switched on needs to be switched on. For example, when the step S80 is executed, when the lighting circuit 30 is still in the state of being switched on, the display screen 20 is switched on after switching off the lighting circuit 30. No further description will be given here.

Figure 5:
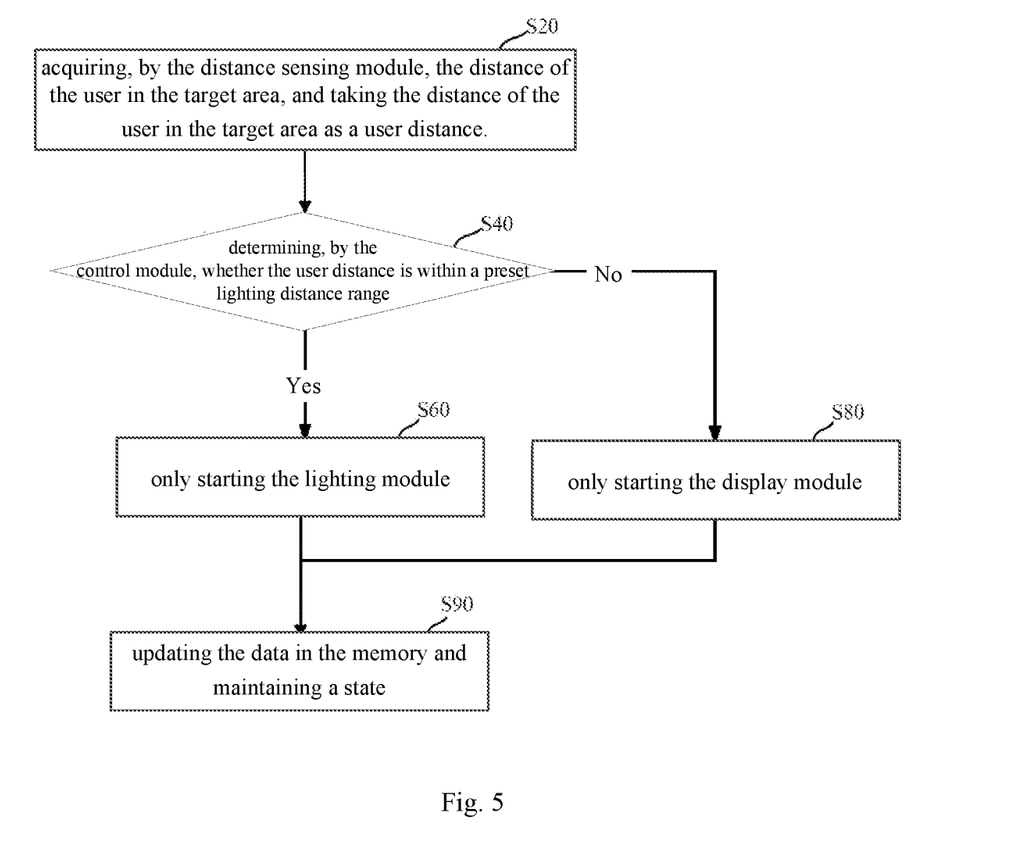
FIG. 5 is a flowchart of a control method of a smart mirror provided by a second embodiment of the present disclosure.

With reference to FIG. 5, the difference between the control method provided by a third embodiment of the present disclosure and the control method provided by the first embodiment is that the control method further comprises the following step after the steps S60 and S80.

S90: updating the data in the preset memory and maintaining a state. This step is used to describe the source of the data in the preset memory and specifically includes the following steps.

Determining whether or not the user distance is acquired by the ultrasonic sensing circuit 42.

When the user distance is acquired by the ultrasonic sensing circuit 42, utilizing the user distance to update the stored distance in the preset memory, saving the user distance in the preset memory for a preset time period, and setting the user distance to be zero after the end of the preset time period. In other words, when the ultrasonic sensing circuit 42 detects that the user distance changes, the user distance is updated when the change is detected. When the ultrasonic sensing circuit 42 detects that the user distance is not changed, the user distance is not updated and the smart mirror is kept in the lighting state to be used as a mirror.

When the user distance is not acquired by the ultrasonic sensing circuit 42, maintaining the state of the smart mirror within a preset duration.

By adoption of the above steps, whether or not the user distance is the newest distance acquired by the ultrasonic sensing circuit 42 can be determined after the end of the control of the smart mirror 100 each time; when the user distance is the newest distance acquired by the ultrasonic sensing circuit 42, the distance in the preset memory is updated according to the newest distance for possible data access in the step S20; and when the user distance is not the newest distance acquired by the ultrasonic sensing circuit 42, it indicates that the distance is accessed from the preset memory, and then the state of the smart mirror 100 is maintained within the preset duration to avoid the reduction of the user experience because of the faulty adjustment of the state of the smart mirror 100.

It should be noted that the preset memory can be integrated into the control circuit 50; and when the smart mirror 100 is used for the first time, the stored data in the preset memory should be forced to be set to be zero. After the return-to-zero process, the acquired user distance is zero when the stored distance in the preset memory is accessed in the step S20.

Figure 6:
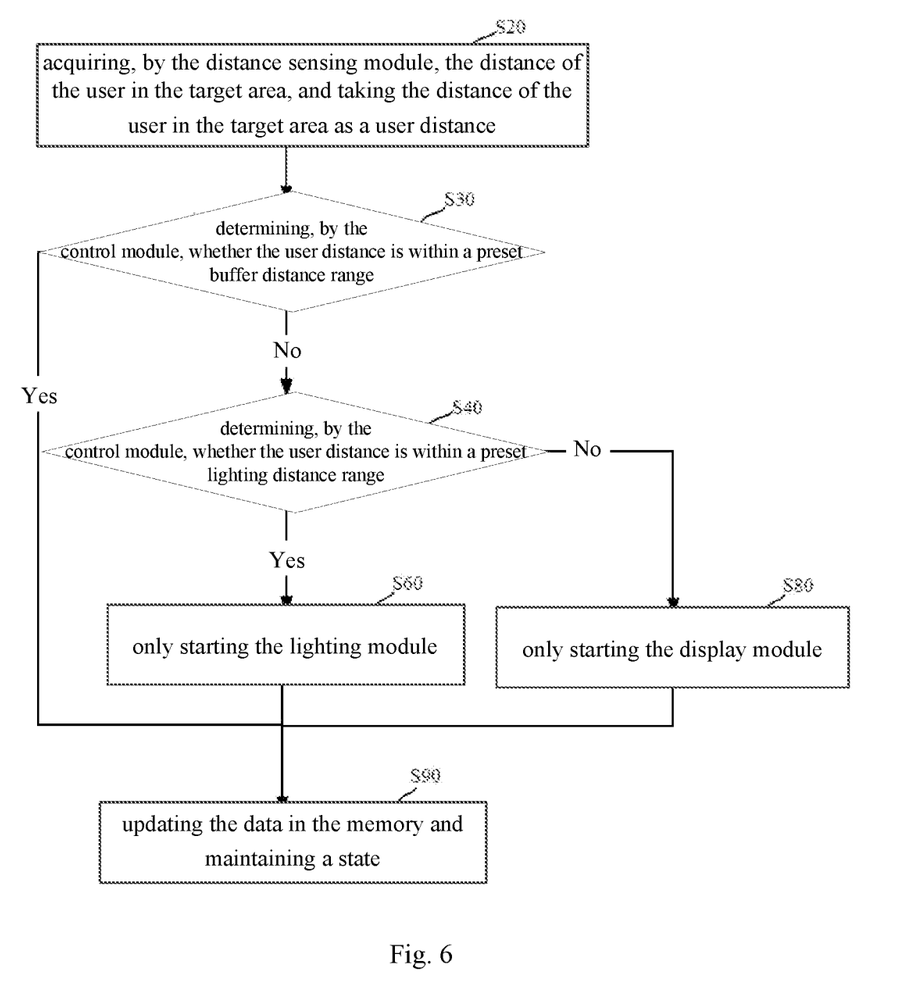
FIG. 6 is a flowchart of a control method of a smart mirror provided by a third embodiment of the present disclosure.

With reference to FIG. 6, the difference between the control method provided by the third embodiment of the present disclosure and the control method provided by a second embodiment is that the control method further comprises the following steps which are between the steps S20 and S40.

S30: determining whether or not the user distance is within a preset buffer distance range, executing the step S40 when the user distance is within the preset buffer distance range, and executing the following step S90 when the user distance is not within the preset buffer distance range.

S90: updating the data in the preset memory and maintaining the state of the smart mirror.

The preset buffer distance is set according to the boundary of a preset illumination range, for example, set to be 0.4 m-0.6 m. When the user is within this range, when the user moves slightly, the user can enter into or exit from the preset illumination range, thereby being respectively recognized as a lighting scene or a display scene, frequently switching between the lighting circuit 30 and the display screen 20, seriously reducing the user experience, and hurting the user's eyes.

The step S30 can be adopted to eliminate the defects caused by the critical range, directly maintain the state of the smart mirror 100, and also effectively ensure the user experience.

S90: updating the data in the preset memory and maintaining the state of the smart mirror. This step is used to describe the source of the data in the preset memory and specifically includes the following steps.

Determining whether or not the user distance is acquired by the ultrasonic sensing circuit 42.

When the user distance is acquired by the ultrasonic sensing circuit 42, utilizing the user distance to update the stored distance in the preset memory, saving the user distance in the preset memory for a preset time period, and setting the user distance to be zero after the end of the preset time period.

Figure 7:
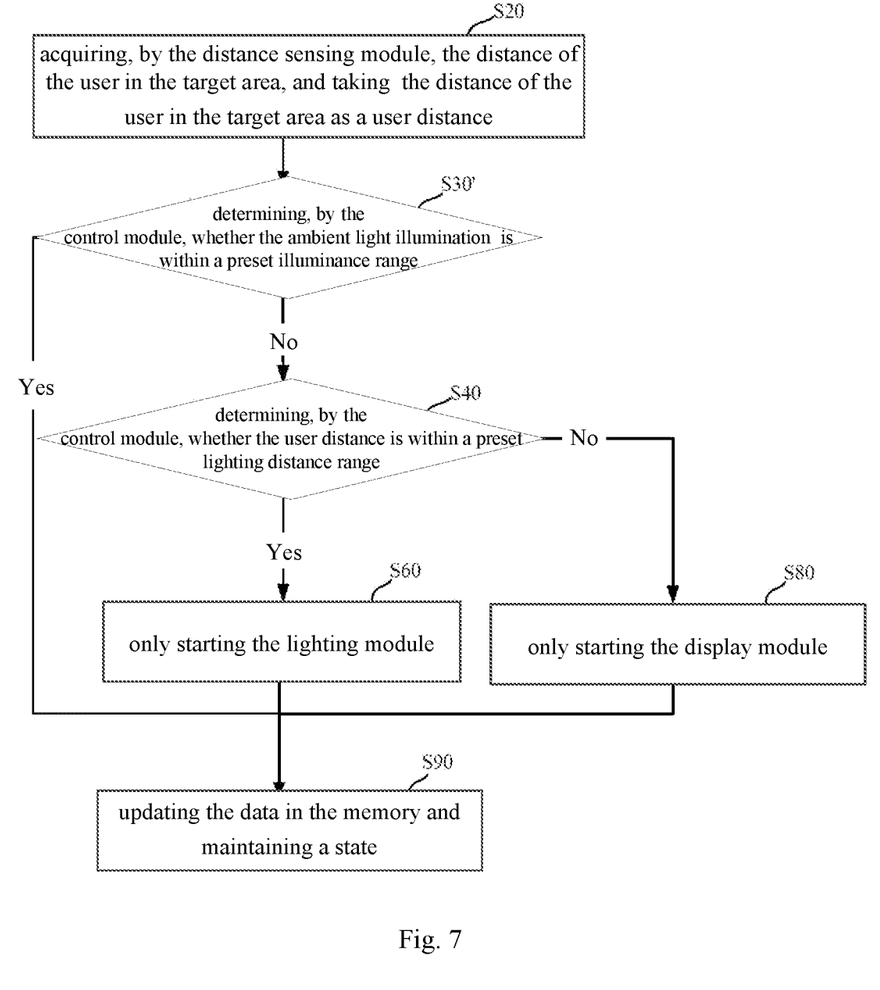
FIG. 7 is a flowchart of a control method of a smart mirror provided by a fourth embodiment of the present disclosure.

When the user distance is not acquired by the ultrasonic sensing circuit 42, maintaining the state of the smart mirror within a preset duration With reference to FIG. 7, the difference between the control method provided by a fourth embodiment of the present disclosure and the control method provided by the second embodiment is that the control method further comprises the following step which is between the steps S20 and S40.

S30': determining whether or not an ambient light illuminance is lower than a preset illuminance, executing the step S40 when the ambient light illuminance is not lower than the preset illuminance, and executing the step S90 when the ambient light illuminance is lower than the preset illuminance.

By determining the ambient light illuminance through the step S30', it can be determined that the environment in which the smart mirror 100 is located requires lighting when the ambient light illuminance is lower than the preset illuminance, and then the lighting circuit 30 can be directly switched on to function as a night-light. This is an independent judgment logic independent from the distance sensing circuit 40, in another example, the independent judgment logic and the distance sensing circuit 40 can be integrated or work independently. No further description will be given here.

Of course, in other embodiments of the present disclosure, the steps S30 and S30' can also be integrated into a process; the executing sequences of the steps S30 and S30' can be changed; and the two steps need to be provided between the steps S20 and S40. No further description will be given here.

Preferably, the display screen comprises a light-emitting diode (LED) dot matrix display screen.

Preferably, the smart mirror further comprises a communication circuit disposed on the rear cover and electrically connected with the display screen; and the communication circuit is configured to acquire the preset information from a preset terminal and to transmit the preset information to the display screen.

Preferably, the communication circuit comprises at least one of a Bluetooth communication circuit, a WIFI communication circuit, a Zigbee communication circuit, an infrared communication circuit or a near field communication (NFC) communication circuit.

Preferably, the preset terminal comprises a smart mobile phone.

Preferably, the lighting circuit comprises an LED light strip.

Preferably, the LED light strip is positioned around a periphery of the display screen.

Preferably, the smart mirror further comprises an optical element covering the lighting circuit.

Preferably, the smart mirror further comprises a light homogenization mask that is connected with the rear cover and covers the lighting circuit.

Preferably, the light homogenization mask is flush with the display mirror surface.

Preferably, the light homogenization mask is positioned around a periphery of the display mirror surface.

Preferably, the distance sensing circuit comprises an infrared sensing circuit and an ultrasonic sensing circuit.

Preferably, a number of the ultrasonic sensing circuit is set to be two; and the two ultrasonic sensing circuits are respectively disposed on two sides of the infrared sensing circuit.

Preferably, the smart mirror further comprises an illuminance sensing circuit disposed on the rear cover and electrically connected with the control circuit.

Preferably, the preset lighting distance is ranged from 0.3 m to 0.5 m.

Preferably, the distance sensing circuit comprises an infrared sensing circuit and an ultrasonic sensing circuit.

Preferably, acquiring, by the distance sensing circuit, of the distance of the user in the target area and taking of the distance of the user in the target area as the user distance specifically comprises:

acquiring a stored distance in a preset memory and taking the stored distance as the user distance when only the infrared sensing circuit in the distance sensing circuit is triggered;

acquiring a distance of the user sensed by the ultrasonic sensing circuit and taking the distance of the user sensed by the ultrasonic sensing circuit as the user distance when the ultrasonic sensing circuit in the distance sensing circuit is triggered.

Preferably, after acquiring, by the distance sensing circuit, the distance of the user in the target area and before determining, by the control circuit, whether or not the user distance is within the preset lighting distance range, the control method further comprises:

determining whether or not the user distance is within a preset buffer distance range, maintaining a state of the smart mirror when the user distance is within the preset buffer distance range, and determining, by the control circuit, whether or not the user distance is within the preset lighting distance range when the user distance is not within the preset buffer distance range.

Preferably, the preset lighting distance is ranged from 0.4 m to 0.6 m.

Preferably, after maintaining the state of the smart mirror, the control method further comprises:

determining whether or not the user distance is acquired by the ultrasonic sensing circuit;

when the user distance is acquired by the ultrasonic sensing circuit, utilizing the user distance to update a stored distance in a preset memory, saving the user distance in the preset memory for a preset time period, and setting the user distance to be zero after the end of the preset time period; and when the user distance is not acquired by the ultrasonic sensing circuit, maintaining the state of the smart mirror within a preset duration.

Preferably, after starting only the lighting circuit or starting only the display screen, the control method further comprises:

determining whether or not the user distance is acquired by the ultrasonic sensing circuit;

when the user distance is acquired by the ultrasonic sensing circuit, utilizing the user distance to update a stored distance in a preset memory, saving the user distance in the preset memory for a preset time period, and setting the user distance to be zero after the end of the preset time period; and when the user distance is not acquired by the ultrasonic sensing circuit, maintaining a state of the smart mirror within a preset duration.

Preferably, the smart mirror further comprises an illuminance sensing circuit disposed on the rear cover and electrically connected with the control circuit; the illuminance sensing circuit is configured to sense an illuminance of an environment and take the illuminance of the environment as an ambient light illuminance; and after acquiring, by the distance sensing circuit, the distance of the user in the target area and before determining, by the control circuit, whether or not the user distance is within the preset lighting distance range, the control method further comprises:

determining, by the control circuit, whether or not the ambient light illuminance is less than a preset illuminance, starting only the lighting circuit when the ambient light illuminance is less than the preset illuminance, and executing steps related to determining, by the control circuit, of whether or not the user distance is within the preset lighting distance range when the ambient light illuminance is not less than the preset illuminance.

Preferably, after starting only the lighting circuit, the control method further comprises:

determining whether or not the user distance is acquired by the ultrasonic sensing circuit;

when the user distance is acquired by the ultrasonic sensing circuit, utilizing the user distance to update a stored distance in a preset memory, saving the user distance in the preset memory for a preset time period, and setting the user distance to be zero after the end of the preset time period; and when the user distance is not acquired by the ultrasonic sensing circuit, maintaining a state of the smart mirror within a preset duration.

As seen from the above technical solutions provided by the embodiments of the present disclosure, the embodiments of the present disclosure senses the distance of the user in the target area through the distance sensing circuit, determines the actual demand of the user according to the distance, and then starts one of the lighting circuit and the display screen, meets the information display requirement, and meanwhile, particularly adapts to the requirement of looking into the mirror with diversified ambient light illuminance, and improves the user experience.

In summary, the control method of the smart mirror 100, provided by the embodiments of the present disclosure, senses the distance of the user in the target area through the distance sensing circuit 40, determines the actual demand of the user according to the distance, starts one of the lighting circuit 30 and the display screen 20, so as to meet the actual demand of the user, the smart mirror 100 particularly adapts to the requirement of looking into the mirror with diversified ambient light illuminance, and improves the user experience.

The embodiments in the description are described in a progressive manner. The same or similar contents of the embodiments can refer to each other. Each embodiment focuses on the content which is different from the other embodiments. In particular, for the system embodiment, because it is basically similar to the method embodiment, the description is relatively simple, and the relevant contents can refer to partial description of the method embodiment.

The above description is only related to the embodiments of the present disclosure and not intended to limit the present disclosure. It is apparent to those skilled in the art that various modifications and changes can be made to the present disclosure. Any modification, equivalent replacement, improvement or the like made within the spirit and scope of the present disclosure shall fall within the scope of the accompanying claims.

What is claimed is:

1. A smart mirror, comprising:
   a rear cover;
   a display screen disposed on the rear cover and configured to display preset information;
   a lighting circuit disposed on the rear cover and configured to emit illumination beam;
   a distance sensing circuit disposed on the rear cover and configured to sense a distance of a user in a target area;
   a control circuit disposed on the rear cover and electrically connected with the display screen, the lighting circuit and the distance sensing circuit, and configured to start one of the display screen and the lighting circuit according to the distance sensed by the distance sensing circuit; and
   a display mirror surface that is disposed on the rear cover and covers at least part of the display screen,
   wherein the distance sensing circuit comprises an infrared sensing circuit and an ultrasonic sensing circuit,
   wherein when only the infrared sensing circuit in the distance sensing circuit is triggered, the distance sensing circuit acquires a stored distance in a preset memory and takes the stored distance as the user distance, and
   wherein when the ultrasonic sensing circuit in the distance sensing circuit is triggered, the distance sensing circuit acquires a distance of the user sensed by the ultrasonic sensing circuit and takes the distance of the user sensed by the ultrasonic sensing circuit as the user distance.

2. The smart mirror according to claim 1, wherein the display screen comprises a light-emitting diode (LED) dot matrix display screen.

3. The smart mirror according to claim 1, wherein the smart mirror further comprises a communication circuit disposed on the rear cover and electrically connected with the display screen; and the communication circuit is configured to acquire the preset information from a preset terminal and to transmit the preset information to the display screen.

4. The smart mirror according to claim 3, wherein the communication circuit comprises at least one of a Bluetooth communication circuit, a WIFI communication circuit, a Zigbee communication circuit, an infrared communication circuit or an NFC communication circuit.

5. The smart mirror according to claim 3, wherein the preset terminal comprises a smart mobile phone.

6. The smart mirror according to claim 1, wherein the lighting circuit comprises an LED light strip.

7. The smart mirror according to claim 6, wherein the LED light strip is positioned around a periphery of the display screen.

8. The smart mirror according to claim 1, wherein the smart mirror further comprises an optical element covering the lighting circuit.

9. The smart mirror according to claim 1, wherein the smart mirror further comprises a light homogenization mask that is connected with the rear cover and covers the lighting circuit.

10. The smart mirror according to claim 9, wherein the light homogenization mask is flush with the display mirror surface.

11. The smart mirror according to claim 9, wherein the light homogenization mask is positioned around a periphery of the display mirror surface.

12. The smart mirror according to claim 1, wherein the control circuit determines whether or not the user distance is within a preset lighting distance range, starts only the lighting circuit when the user distance is within the preset lighting distance range, and starts only the display screen when the user distance is not within the preset lighting distance range.

13. The smart mirror according to claim 1, wherein a number of the ultrasonic sensing circuit is set to be two; and the two ultrasonic sensing circuits are respectively disposed on two sides of the infrared sensing circuit.

14. The smart mirror according to claim 1, wherein the smart mirror further comprises an illuminance sensing circuit disposed on the rear cover and electrically connected with the control circuit.

15. A control method implemented by a smart mirror comprising a distance sensing circuit comprising an infrared sensing circuit and an ultrasonic sensing circuit, a lighting circuit, a display screen, and a control circuit, the control method comprising:
when only the infrared sensing circuit in the distance sensing circuit is triggered, acquiring, by the distance sensing circuit, a stored distance in a preset memory and taking the stored distance as a user distance;
when the ultrasonic sensing circuit in the distance sensing circuit is triggered, acquiring, by the distance sensing circuit, a distance of a user in a target area sensed by the ultrasonic sensing circuit and taking the distance of the user sensed by the ultrasonic sensing circuit as the user distance; and
determining, by the control circuit, whether or not the user distance is within a preset lighting distance range, starting only the lighting circuit when the user distance is within the preset lighting distance range and starting only the display screen when the user distance is not within the preset lighting distance range.

16. The control method according to claim 15, wherein the preset lighting distance is ranged from 0.3 m to 0.5 m.

17. The control method according to claim 15, wherein the distance sensing circuit comprises two ultrasonic sensing circuits respectively disposed on two sides of the infrared sensing circuit.

18. The control method according to claim 15, further comprising:
when the smart mirror is used for a first time, setting the stored distance in the preset memory to be zero.

19. The control method according to claim 17, wherein after acquiring, by the distance sensing circuit, the distance of the user in the target area and before determining, by the control circuit, whether or not the user distance is within the preset lighting distance range, the control method further comprises: determining whether or not the user distance is within a preset buffer distance range, maintaining a state of the smart mirror when the user distance is within the preset buffer distance range, and determining, by the control circuit, whether or not the user distance is within the preset lighting distance range when the user distance is not within the preset buffer distance range.

20. The control method according to claim 19, wherein after maintaining the state of the smart mirror, the control method further comprises: determining whether or not the user distance is acquired by the ultrasonic sensing circuit; when the user distance is acquired by the ultrasonic sensing circuit, utilizing the user distance to update a stored distance in a preset memory, saving the user distance in the preset memory for a preset time period, and setting the user distance to be zero after the end of the preset time period; and when the user distance is not acquired by the ultrasonic sensing circuit, maintaining the state of the smart mirror within a preset duration.

* * * * *